United States Patent [19]

Atkins et al.

[11] 4,256,712
[45] Mar. 17, 1981

[54] REGENERABLE PROCESS FOR SO$_2$ REMOVAL EMPLOYING GELATINOUS ALUMINUM HYDROXIDE AS ABSORBENT

[75] Inventors: Richard S. Atkins, Freehold; Asim B. Ray, Bridgewater, both of N.J.

[73] Assignee: Research-Cottrell, Inc., Bridgewater Township, Somerset County, N.Y.

[21] Appl. No.: 913,093

[22] Filed: Jun. 6, 1978

[51] Int. Cl.$^3$ .................. C01B 17/00; C01B 17/02
[52] U.S. Cl. ............................. 423/242; 423/574 R
[58] Field of Search ............ 423/242, 243, 244, 574; 252/189, 190

[56] References Cited

U.S. PATENT DOCUMENTS

| | | | |
|---|---|---|---|
| 1,387,857 | 8/1921 | McKee | 423/244 X |
| 1,589,133 | 6/1926 | Eustis | 423/242 R |
| 1,895,724 | 1/1933 | Miller et al. | 423/244 X |
| 2,729,543 | 12/1955 | Keller | 423/242 A |
| 3,520,649 | 7/1970 | Tomany et al. | 423/242 A |

FOREIGN PATENT DOCUMENTS 4938882  11/1974  Japan .......................... 423/242

Primary Examiner—O. R. Vertiz
Assistant Examiner—Gregory A. Heller
Attorney, Agent, or Firm—Dennis P. Clarke

[57] ABSTRACT

A regenerable process for removing SO$_2$ from a gas comprising contacting the gas with an aqueous suspension of gelatinous aluminum hydroxide.

17 Claims, 5 Drawing Figures

REGENERABLE PROCESS FOR SO₂ REMOVAL EMPLOYING GELATINOUS ALUMINUM HYDROXIDE AS ABSORBENT

BACKGROUND OF THE INVENTION

Numerous methods are known for removing $SO_2$ from gas streams such as flue gas. These methods find particular application in the area of rendering gaseous effluents from industrial or utility power plants safe from an environmental standpoint.

A wide variety of absorbents have been heretofore utilized for absorbing $SO_2$ from gas streams. The most advantageous processes are those wherein following absorption, the spent absorbent is capable of facile regeneration to its original state for further absorption of $SO_2$. As a general rule, however, those compounds which are highly $SO_2$ absorbent are difficult to regenerate; usually requiring a multi-step, expensive procedure for complete regeneration to the original absorbent state. Those compounds which, after absorption of $SO_2$, are easily regenerable are normally not the most efficient absorbers of $SO_2$.

The use of sodium salt solutions for absorption of $SO_2$ have been in use for many years. The sodium compounds being soluble and more basic have obvious advantages over aluminum compounds. However, these very facts also work against sodium compounds, specifically during the regeneration step. For example, sodium bisulfite, the reaction product of $SO_2$ scrubbing, is more stable and basic than either aluminum sulfite or aluminum basic sulfite and requires considerably more energy for regeneration.

Also, sodium sulfate which is formed during scrubbing is an irrevocable source of sodium loss. But in the aluminum system the scrubbing agent, i.e., aluminum hydroxide, is easily recovered from the sulfate. Moreover, the other products associated with $Al_2(SO_4)_3$, for example, $Al(OH)SO_3$ and $Al(OH)_3$, being insoluble, are easily separated from the soluble aluminum sulfate.

Aluminum sulfate also plays an important role in the regeneration step. On heating an aluminum sulfate solution the pH of the solution drops. But on cooling the pH of the solution reverts back almost to its original value. This unique property enables more facile removal of $SO_2$ from the sulfite slurry.

In addition, the aluminum system can operate in the presence of chloride ions while in the sodium system chlorine equivalent of sodium is irrevocally lost.

Among the regenerative absorption processes heretofore employed is that described in U.S. Pat. No. 2,311,202 wherein an aqueous solution of basic aluminum sulfate is employed as the absorbent liquid. The spent absorbent is regenerated as an aluminum hydroxide precipitate which is redissolved in sulfurous acid and recycled for further absorption of $SO_2$.

U.S. Pat. No. 3,943,230 also discloses utilizing basic aluminum sulfate as an absorbent for $SO_2$.

U.S. Pat. No. 3,959,441 discloses a process for scrubbing sulfur dioxide from stack gases employing an absorbing solution prepared by adding a hydroxide of a Group III metal to an aqueous solution of a halide of the same metal.

U.S. Pat. No. 3,761,570 relates to the removal of sulfur compounds from gases by contact with an aqueous suspension of a hydrolyzed admixture of an oxide, hydrated oxide or hydroxide of aluminum, zinc, iron or manganese and a basic component such as an oxide or hydroxide of an alkali metal or alkaline earth metal.

It is an object of the present invention to provide a regenerable absorption process for removing $SO_2$ from gases utilizing an aluminum compound as an absorbent for $SO_2$, which aluminum compound has not been heretofore used in this capacity.

SUMMARY OF THE INVENTION

The present invention relates to a process for the removal of $SO_2$ from gases comprising contacting the gas with an aqueous suspension of gelatinous aluminum hydroxide.

The spent absorbent is easily regenerated by heating, optionally in the presence of sparged carrier gas, steam stripping or vacuum compression, to produce evolved $SO_2$ and gelatinous aluminum hydroxide. Optionally, the spent absorbent is regenerated by contact with $H_2S$ which converts the spent absorbent to gelatinous aluminum hydroxide and sulfur.

DETAILED DESCRIPTION OF THE INVENTION

As is apparent from the above-discussed patents, aluminum compounds have been tried as absorbents for the removal of $SO_2$ from gas mixtures without much commercial success. The present invention is predicated on the discovery that gelatinous aluminum hydroxide is an unexpectedly efficient absorbent for $SO_2$ and is easily regenerable in a continuous process for the removal of $SO_2$ from gas streams.

Sulfur dioxide may be removed from gas streams by merely passing the gas through an aqueous suspension or slurry of gelatinous aluminum hydroxide. It will be understood by those skilled in the art that the gas may be passed through a static aqueous suspension or slurry of the gelatinous aluminum hydroxide or the gas and slurry may be contacted co-currently or countercurrently, depending upon the particular requirements of the specific system in which the $SO_2$ removal system is incorporated. The most preferred embodiment is to pass the gas in an upward direction through a vertical tower, preferably packed with a particulate, inert material, countercurrently to an aqueous suspension of the gelatinous aluminum hydroxide which is passed in a downward direction through the packed column. The inert material may comprise stainless steel rings, corrugated plastic (polypropylene) plates, etc. It has been found that this method of contacting the gas and gelatinous aluminum hydroxide slurry results in the most efficient removal of $SO_2$ from the gas stream and is most susceptible to a regenerable, continuous operation.

During the $SO_2$ absorption, it is theorized that the following reactions take place:

$$Al(OH)_3 + SO_2 \rightarrow Al(OH)SO_3 + H_2O$$

$$2Al(OH)_3 + 3SO_2 \rightarrow Al_2(SO_3)_3 + 3H_2O$$

It has also been observed that some oxidation of the sulfite to sulfate also takes place according to the following:

$$2Al_2(SO_3)_3 + 3O_2 \rightarrow 2Al_2(SO_4)_3$$

$$3Al(OH)SO_3 + 1.5O_2 \rightarrow Al_2(SO_4)_3 + AL(OH)_3$$

$$Al(OH)SO_3 + 0.5O_2 \rightarrow Al(OH)SO_4$$

It is not known why the gelatinous form of aluminum hydroxide in slurry form most efficiently absorbs SO$_2$ from gas streams. Crystaline aluminum hydroxide reacts only very slowly and in insufficient amounts with SO$_2$ to be of any practical value as an SO$_2$ absorbent. Moreover, the use of suspensions or slurries of gelatinous aluminum hydroxide have been found to be far superior to clear solutions of aluminum hydroxide or other aluminum salts as SO$_2$ absorbents. It is theorized that the gelatinous nature of the aluminum hydroxide in suspension form provides the greatest surface area for contact with, and absorbence of, SO$_2$. It is to be understood, however, that we do not intend to be bound by any theory or mechanism as to the chemistry of the absorption.

The temperature of the system during the absorption cycle is not overly critical. Generally, the temperature may range from ambient to about 180° F. Because of normal operating conditions, especially in power-generating industry, best results are obtained at temperatures between about 110° to about 140° F.

The limiting reaction parameter of the system is the pH of the scrubbing liquor. It is generally preferred to employ as a scrubbing liquor an aqueous suspension or slurry of gelatinous aluminum hydroxide containing from about 1 to about 15%, by weight, of gelatinous aluminum hydroxide. The pH of gelatinous aluminum hydroxide suspensions having a concentration within this range generally have a pH from about 3 to about 8, preferably from about 5 to about 6.

As SO$_2$ is absorbed by the scrubbing liquor, the pH of the suspension is gradually lowered. It is preferred to maintain the pH of the scrubbing liquor at about 2.8 or above. At pH's below 2.8, there is significant loss of SO$_2$ from the liquor as gaseous effluent. Preferably, the pH of the scrubbing liquor is maintained at about 3.5 or higher to avoid excessive corrosion and loss of SO$_2$ as sulfate ion.

Gelatinous aluminum hydroxide may be obtained from any conventional source or may be prepared according to known and conventional techniques. For example, the gelatinous aluminum hydroxide suspension can be prepared by adding an alkali to a soluble aluminum salt such as aluminum sulfate or chloride. The alkali normally employed is sodium carbonate, caustic soda, or ammonia. Alternatively, the gelatinous aluminum hydroxide may be prepared by fusing aluminum oxide with an alkali and subsequently precipitating the gelatinous aluminum hydroxide by dilution of the reaction mixture with water. The gelatinous aluminum hydroxide may also be prepared by acidifying a sodium aluminate solution with, e.g., carbon dioxide. Most preferably, the gelatinous aluminum hydroxide suspension or slurry is freshly prepared immediately prior to utilization in an SO$_2$ absorption system. However, it will be understood that previously prepared gelatinous aluminum hydroxide may be stored as an aqueous suspension or gel without losing appreciable reactivity.

Gelatinous aluminum hydroxide may be represented by the formula Al(OH)$_3$·xH$_2$O, wherein x may vary over a considerable range, usually from about 15 to about 80.

The method of the present invention may be employed to remove SO$_2$ from any gas admixture. The invention finds particular application in the removal of SO$_2$ from flue gas.

The unexpected nature of the SO$_2$ absorption capacity of gelatinous aluminum hydroxide is evident from the following comparison. U.S. Pat. Nos. 3,943,230; 3,595,441; and No. 2,311,202 relate to absorbing SO$_2$ from gases with a clear solution of basic aluminum sulfate. Basic aluminum sulfate has a solubility of about 350 g/l and an active hydroxide level of 156 g of Al(OH)$_3$/l. The present process employs an aqueous slurry of aluminum hydroxides which has an active hydroxide level of only 60 g of Al(OH)$_3$/l for SO$_2$ absorption. Thus, the use of gelatinous aluminum hydroxide would appear to yield inferior results compared with basic aluminum sulfate due to the lowered active hydroxide level of Al(OH)$_3$/l. Even though the method of the present invention has less available alkali, e.g., 60 g of Al(OH)$_3$/l, when using a 6% by weight of Al(OH)$_3$ aqueous suspension as a scrubbing agent, for absorption, the present process results in a removal of 25 to 45 g of SO$_2$ per liter of solution compared to about 12 g of SO$_2$ per liter employing solutions of basic aluminum sulfate. The precise reasons for this descrepance are not known. It is theorized that the buffering reactions which occur in solutions of basic aluminum sulfate interfere with the absorption of SO$_2$ whereas no such buffering action or reactions occur in the system of the invention.

One of the inherent advantages of the method of the invention is the ease of regeneration of the gelatinous aluminum hydroxide absorbent. This enables the provision of a continuous regenerable process which does not require shutdown and loss of valuable down time for SO$_2$ removal systems.

During the regeneration step, the SO$_2$ laden slurry may be heated to an elevated temperature sufficient to cause evolution of SO$_2$ and conversion of the absorbent to gelatinous aluminum hydroxide in aqueous suspension form according to the following formulas:

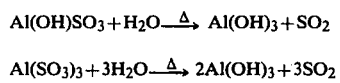

$$Al(SO_3)_3 + 3H_2O \xrightarrow{\Delta} 2Al(OH)_3 + 3SO_2$$

Generally, temperatures of about 158° F. or higher are sufficient to regenerate the spent absorbent. It will be understood, however, that when utilizing vacuum conditions for regeneration, a lower temperature may be employed.

Some oxidation of the sulfite ion takes place during the absorption cycle and during regeneration. The composition and the pH of the regenerated slurry is dependent not only upon the temperature of regeneration but also on the hold-up time in the regenerating apparatus. A pH of about 4 is easily obtainable at 158° F. with a hold-up time of about 30 minutes. The regenerated slurry may then be pumped back to the absorber while the evolved SO$_2$ is sent to a sulfur recovery unit.

A bleed stream of the regenerated slurry may be filtered to yield a filtrate containing Al$_2$(SO$_4$)$_3$. The aluminum sulfate solution may also be sent to a gelatinous aluminum hydroxide regenerator. The residue of the filtration step, which contains a mixture of Al(OH)$_3$, Al(OH)SO$_3$ and small amounts of Al(OH)SO$_4$ is sent back to the SO$_2$ absorber.

Gelatinous aluminum hydroxide may be regenerated from the aluminum sulfate solution by one of the following procedures.

1. Reacton with ammonia during which the following reaction occurs:

$$Al_2(SO_4)_3 + 6NH_3 + 6H_2O \rightarrow 2Al(OH)_3 + 3(NH_4)_2SO_4$$

The gelatinous aluminum hydroxide may be filtered off and the ammonium sulfate solution sent to an ammonia recovery section wherein lime or lime stone is added to evolve ammonia and yield calcium sulfate (gypsum). The ammonia may be recycled for preparation of the gelatinous aluminum hydroxide slurry or other purposes.

2. Reaction with a soluble calcium salt, during which the following reaction occurs:

$$Al_2(SO_4)_3 + 3CaCl_2 \rightarrow 2AlCl_3 + 3CaSO_4$$

The gypsum is filtered off and the soluble aluminum chloride or other soluble aluminum salt is reacted with lime or limestone to produce gelatinous aluminum hydroxide and calcium chloride or similar salt.

Alternatives to regeneration of aluminum hydroxide from aluminum sulfate are use of the aluminum sulfate in water purification plants, paper treatment, etc.

The aluminum sulfate can also be crystallized from the solution and decomposed thermally to recover both sulfur and aluminum values.

The scrubber slurry can also be regenerated by reacting the spent suspension with $H_2S$. The advantages of this method are that the prior evolution of $SO_2$ from the scrubber slurry is not necessary. The spent absorbent reacts with hydrogen sulfide according to the following formulas:

$$Al(OH)SO_3 + 2H_2S \rightarrow Al(OH)_3 + 3S° + H_2O$$

$$Al_2(SO_3)_3 + 6H_2S \rightarrow 2Al(OH)_3 + 9S° + 3H_2O$$

Preferably, the $H_2S$ is contacted with the slurry at a pH of 2.8–4. The pH of the slurry will subsequently rise indicating the regeneration of gelatinous aluminum hydroxide. Contact with $H_2S$ is discontinued when the slurry reaches a pH indicating the complete regeneration of gelatinous aluminum hydroxide, namely, about 5.5. The sulfur may be separated from the slurry by conventional procedures, i.e., melting and filtration. The gelatinous aluminum hydroxide is then recirculated to the absorbent cycle. Again, any aluminum sulfate formed during the process is separated and regenerated according to the methods described above.

Where the spent absorbent is regenerated by heating to evolve $SO_2$, it is preferred to sparge the suspension with a gas such as air during the heating step.

The $SO_2$ evolved during the regeneration step may be collected and liquified, may be sent to a sulfuric acid production system or to a Claus plant for the production of elemental sulfur.

A particularly preferred embodiment comprises a continuous absorption-regenerable process for removing $SO_2$ from a gas comprising contacting the gas in a first zone with an aqueous suspension or slurry of gelatinous aluminum hydroxide whereby the sulfur dioxide is absorbed by the gelatinous aluminum hydroxide. A portion of the aqueous suspension or slurry containing absorbed $SO_2$ is withdrawn and heated in a second zone while sparging with a gas such as air to evolve $SO_2$ therefrom and to convert the absorbent to suspended gelatinous aluminum hydroxide which is recycled as fresh absorbent to the first zone for absorption of $SO_2$ from the gas mixture. The first zone preferably comprises an elongated, vertical column packed with an inert material pervious to the flow of the aqueous slurry or suspension and also pervious to the gas mixture to be separated. Preferably, the aqueous slurry of suspended gelatinous aluminum hydroxide and $SO_2$ containing gas are contacted countercurrently in the packed tower.

Preferably, the above-described continuous process also includes the step of continuously filtering at least a portion of the regenerated aqueous suspension to recover gelatinous aluminum hydroxide which is recycled to the first zone and a filtrate containing dissolved aluminum sulfate, The latter being converted to an aqueous suspension of gelatinous aluminum hydroxide which is recycled to the said first zone.

The invention will be further illustrated by the following non-limiting examples:

EXAMPLE 1

A 3% aqueous suspension of J. T. Baker's reagent grade hydrated $Al(OH)_3$ was used as the $SO_2$ absorption agent. 350 ml of the above suspension containing 135 millimoles of $Al(OH)_3$ was placed in the three necked 500 ml glass flask shown in FIG. 3. The pH of the above slurry was 6.0. The contents of the flask were heated to 130°–135° F. Pure $SO_2$ gas was passed through the slurry at the rate of 25 ml/minute. Within a minute the pH of the slurry fell to 1.0. Analysis showed that very little $SO_2$ has been absorbed by the $Al(OH)_3$ slurry. Most of the $SO_2$ was found in the NaOH trap flask.

A similar run was made using aluminum hydroxide, $Al(OH)_3.nH_2O$ powder, obtained from Fischer Scientific Co. This aluminum hydroxide with 32–35% water of hydration also failed to react with $SO_2$.

Finally, gelatinous $Al(OH)_3$ prepared in the following manner showed large capacity for $SO_2$ absorption.

Ammonium hydroxide was added to a solution of 33 gm of $AlCl_3.6H_2O$ dissolved in 250 ml of water until all aluminum was precipitated as $Al(OH)_3$. The $Al(OH)_3$ was filtered, washed with distilled water until free from $NH_4+$ and $Cl-$ ions. The washed $Al(OH)_3$ was then suspended in 350 ml of water. This suspension of $Al(OH)_3$—3% slurry, 134 millimoles of $Al(OH)_3$—was then heated to 130°–135° F. and pure $SO_2$ gas passed therethrough at the rate of 80 ml/minute in the system depicted in FIG. 3. The pH of the slurry, after 50 minutes of $SO_2$ passage, fell from 6.1 to 2.70. Analysis showed that 75% of the $SO_2$ passed had been absorbed by the $Al(OH)_3$ slurry. The analysis showed the ratio of $Al:SO_2$ in the slurry to be 1:1.

EXAMPLE 2

$Al(OH)_3$ was made in the following manner: To a solution of $Al_2(SO_4)_3$ in water a stoichiometric amount of $CaCl_2$ was added. The precipitated gypsum, $CaSO_4.2 H_2O$, was filtered off. To the above filtrate a stoichiometric amount of $Ca(OH)_2$ was added to precipitate all aluminum as $Al(OH)_3$. This $Al(OH)_3$ was gelatinous in nature. It was washed until free from $Ca^{+2}$, $Cl^-$ and $SO_4^{-2}$ ions.

Figure 1:
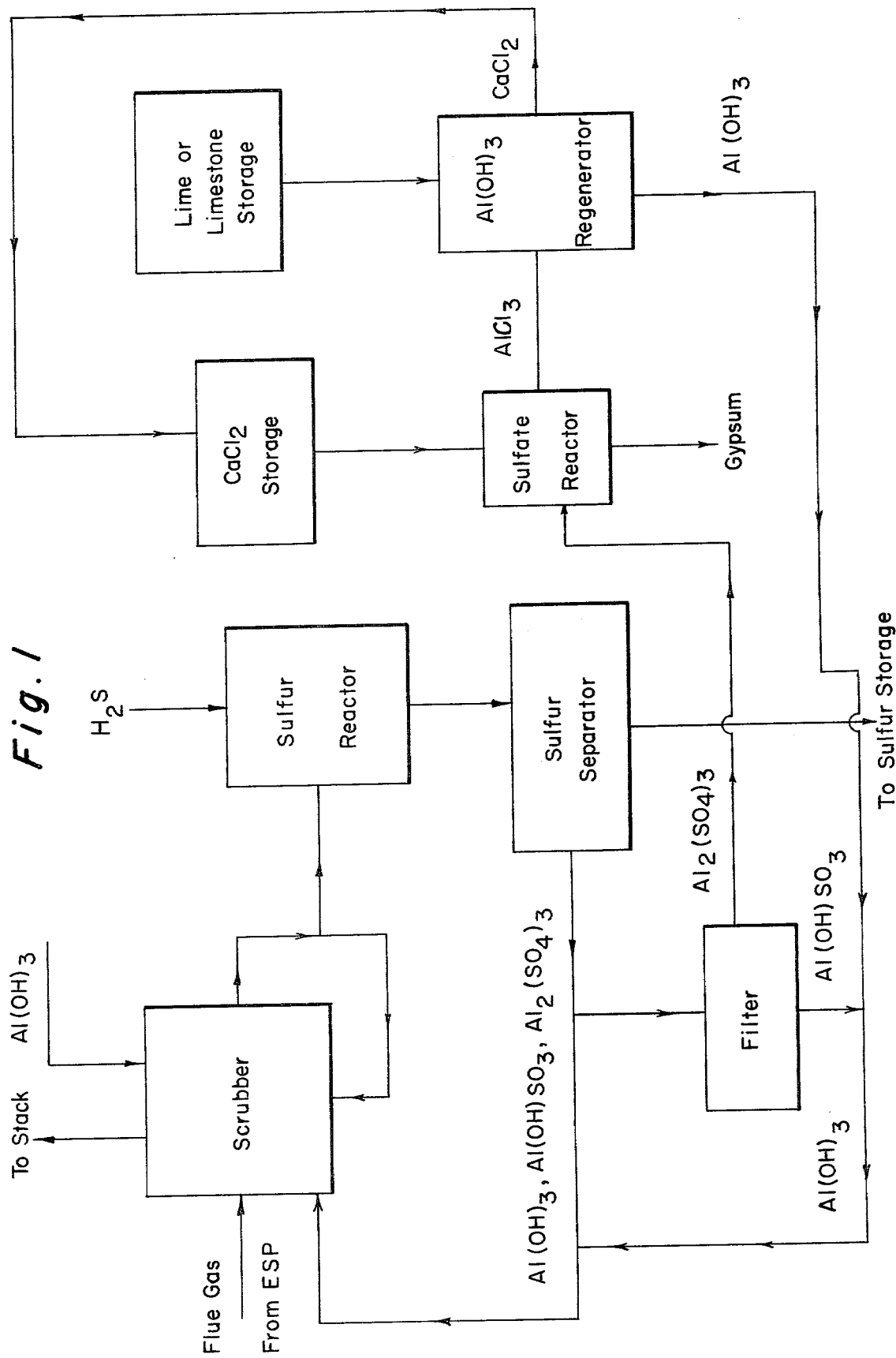
FIG. 1 represents a flow sheet of a regenerable $SO_2$ absorption process which results in the production of elemental sulfur from the spent absorbent.
Figure 2:
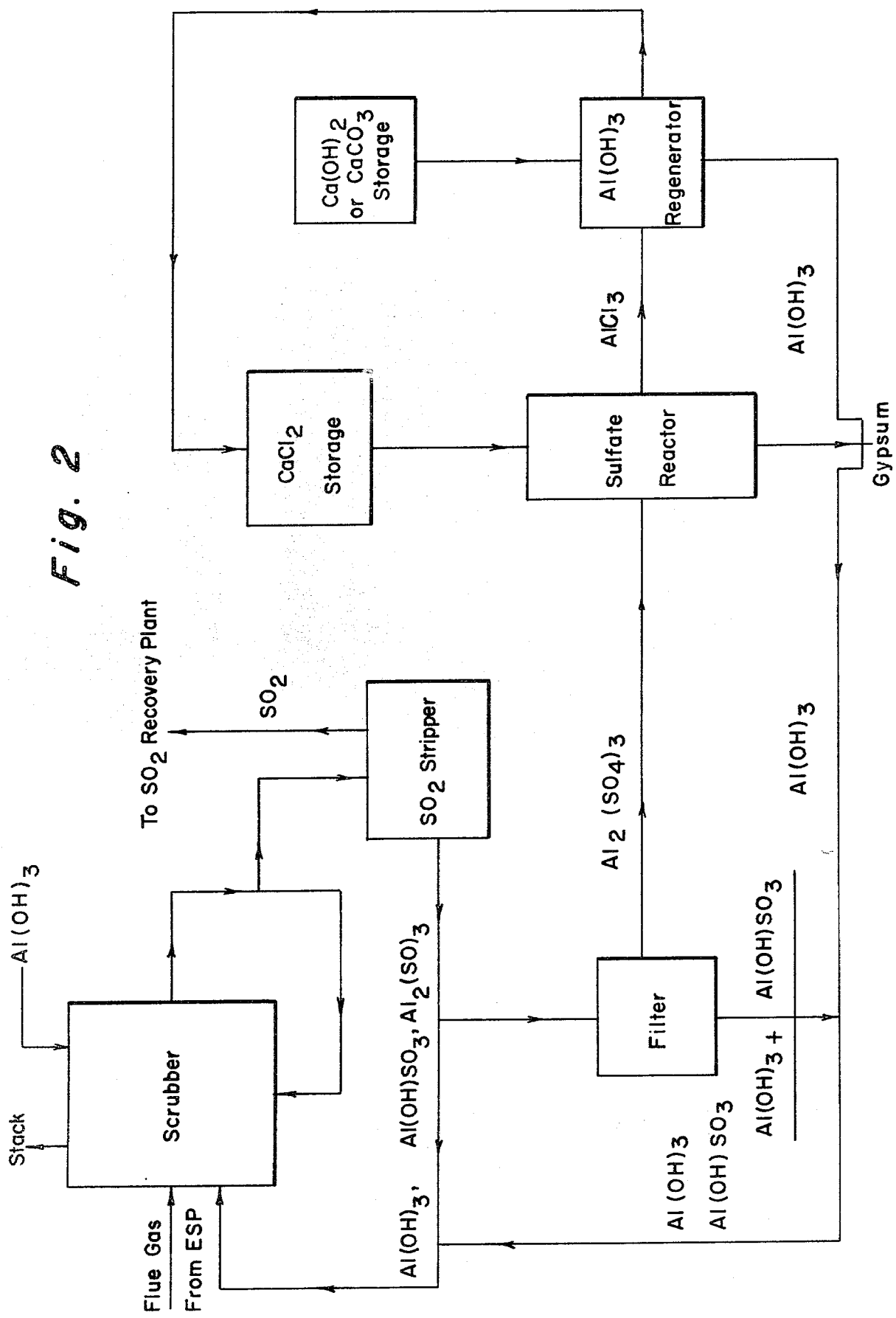
FIG. 2 represents a flow sheet of a regenerable $SO_2$ absorption system wherein the $SO_2$ evolved from the regeneration step is cycled to a sulfuric acid production plant.
Figure 3:
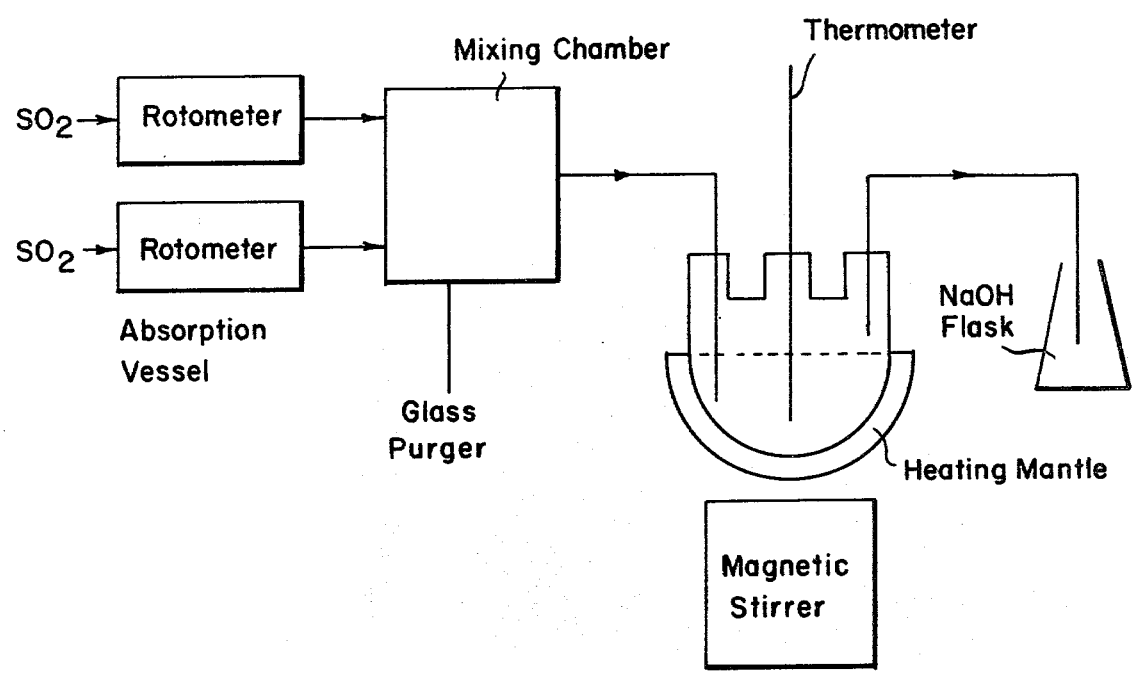
FIG. 3 represents an experimental setup of the system employed to conduct the process described in Examples 1 and 2 hereinbelow.

An aqueous suspension of 77 millimoles of the above hydroxide in a volume of 250 ml was placed in the absorption vessel shown in FIG. 3. It was heated to 130°–135° F. and through this suspension a mixture of $SO_2$/Air was passed at the rate of 2500 ml/minute. The concentration of $SO_2$ in the above mixture was 5000 ppm. Gas flow was stopped after 110 minutes. The pH of the slurry was 2.8. Analysis showed that all the $SO_2$ has been absorbed by $Al(OH)_3$ slurry. Of the 63 millimoles of $SO_2$ passed through the slurry 4 millimoles had been oxidized to sulfate while 59 millimoles remained as sulfite. The above slurry was then heated to $158° \pm 10°$ F. and air was passed through the hot slurry at the rate of 50 ml/minute to facilitate $SO_2$ evolution. During this heating or regeneration step 12 millimoles of $SO_2$ was evolved while in the slurry 38 millimoles of $SO_2$ and 9 millimoles of sulfate remained. The slurry was then cooled to 130°–135° F. and a further amount of $SO_2$ (51 millimoles) was passed through the regenerated slurry. All the $SO_2$ was absorbed by the slurry and the pH fell to 2.0. Analysis of the slurry showed an $Al:SO_2$ ratio of 1:1. This $SO_2$-rich slurry was again heated with air passage, as described above. After 45 minutes of regeneration the following results were observed.

Amount of $SO_2$ evolved-42 millimoles, amount of $SO_2$ remaining in the slurry—42 millimoles and the amount of sulfate— 15 millimoles.

The aluminum to $SO_2$ ratio in the slurry was 1.8:1.
The pH of the slurry was 3.40.

EXAMPLE 3

Figure 4:
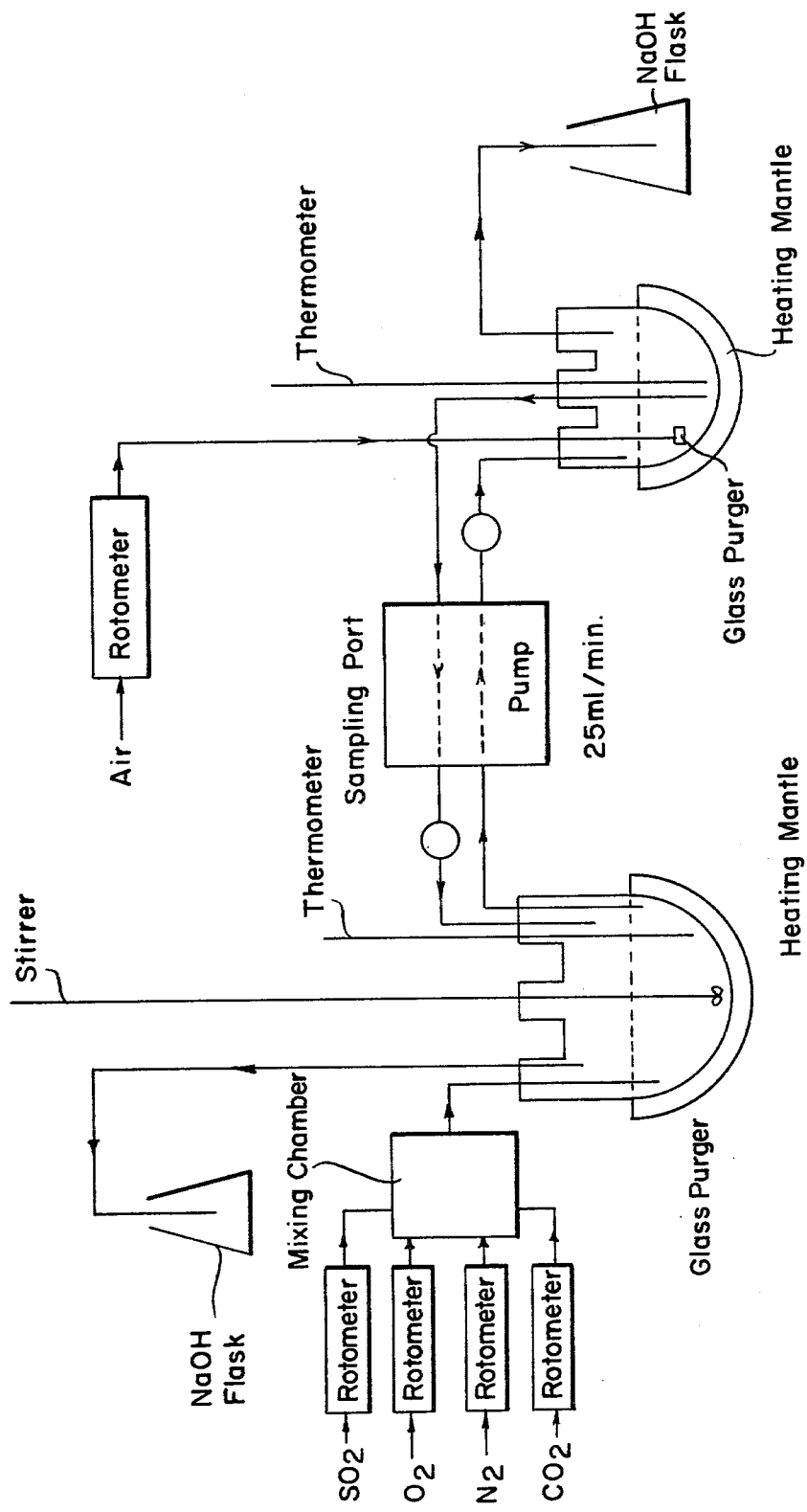
FIG. 4 depicts a laboratory setup of a system employed to conduct the process described in Example 3. The system represents a continuous absorption-regeneration process.

A continuous absorption-regeneration process was carried out using the system shown in FIG. 4. The $Al(OH)_3$ used was made by reacting $Al_2(SO_4)_3$ solution with $NH_4OH$, filtering and washing off $NH_4^+$ and $SO_4^{-2}$ ions.

910 millimoles of $Al(OH)_3$ in 2000 ml of water, pH 5.8, was used as the absorbent. A gas mixture of the following composition: 15% $CO_2$, 8% $O_2$, 0.5% $SO_2$, 76.5% $N_2$ was passed through the slurry at a rate of 2500 ml/minute. The process was carried out in the following manner:

The gas mixture was passed through the slurry until the pH changed from 5.8 to 3.80. At this point the continuous absorption-regenerating cycle was started. The temperature of the absorber was kept at 125°–130° F. while the temperature of the regenerator flask was kept between 158°–165° F. During the absorption-regeneration cycle equal amounts of slurry (25 ml/minute) were withdrawn from the absorber and the regenerator in the manner shown in FIG. 4. The stripping of $SO_2$ from the absorber was accomplished by bubbling air via a glass sparger through the regenerator a rate of 25–30 ml/minute. Two caustic soda traps were used to collect $SO_2$ evolved from the system—one at the absorber end and the other at the regenerator exit.

The absorption-regenerator cycles was operated for 25 hours. After the end of 25 hours a complete mass balance was carried out. The amounts of reactants were 975 millimoles of $SO_2$ and 910 millimoles of $Al(OH)_3$. A total of 875 millimoles of $SO_2$ was absorbed by the slurry which corresponds to 90% absorption. 644 millimoles of $SO_2$ was regenerated while 109 millimoles of $SO_2$ remained in the slurry. Also, 120 millimoles of sulfate was formed during the process. Thus, of the absorbed $SO_2$ 74% was evolved, 12.5% remained in the slurry while 13.5% was oxidized to sulfate.

EXAMPLE 4

Figure 5:
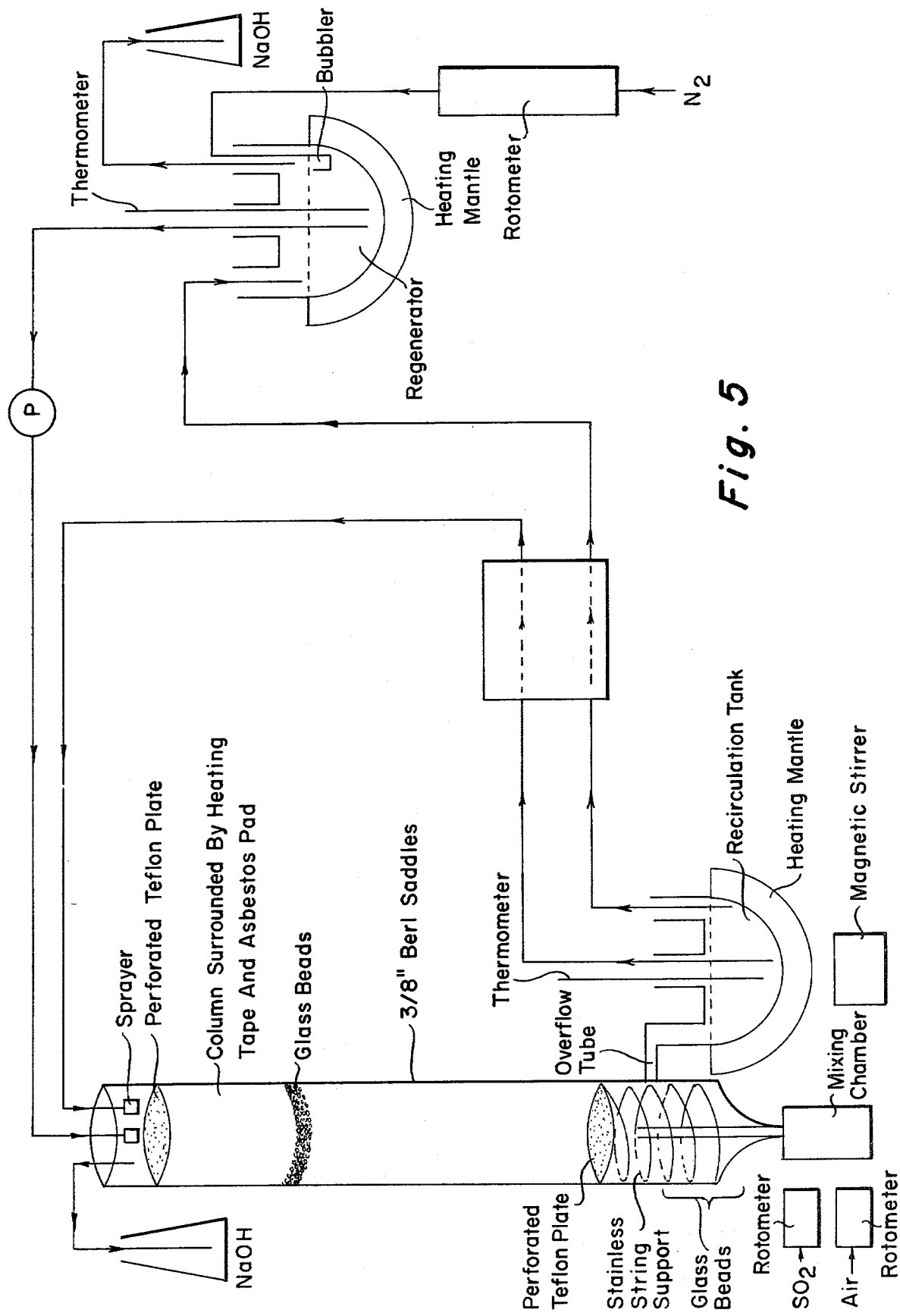
FIG. 5 also represents an experimental setup for a continuous regenerable-absorption system wherein a packed tower is employed for contact of the $SO_2$ gas and gelatinous aluminum hydroxide slurry.

A continuous absorption-regeneration cycle was carried out using a packed tower. A glass pipe of 2" diameter and 18" (inches) long was used as an absorption column. This tube was packed with $\frac{3}{4}$" Berl Saddles (unglazed porcelain) and glass beads. The system is shown in FIG. 5.

The $Al(OH)_3$ used for this run was made by reacting $AlCl_3$ solution with a stoichiometric amount of $Ca(OH)_2$ slurry.

Analysis of the washed $Al(OH)_3$ slurry showed it to be 99% $Al(OH)_3$. A slurry of 640 millimoles of $Al(OH)_3$, pH 5.60, in 2000 ml of water was used as the scrubbing agent. Pure $SO_2$ gas was passed through the slurry until the pH reached 3.60. At this point the continuous operation was started. The composition of the solution at this pH was: 640 mm of $Al(OH)_3$ and 320 mm of $SO_2$.

The slurry of $Al(OH)_3$ was heated to 130°–135° F. by means of a hot plate and was kept in suspension by a magnetic stirrer. This hot slurry was pumped into the tower.

A gas stream containing 15% $CO_2$, 6% $O_2$, 0.5% $SO_2$, and 78.5% $N_2$ (all volume percent) was passed into the tower, counter currently, at the rate of 2500 ml/minute.

A small volume, about 25 ml/minute, of the spent scrubber slurry was pumped into the generator. The temperature of the regenerator was between 155°–165° F. $SO_2$ liberated was stripped by the passage of air flowing through the regenerator at the rate of 30 ml/minute. The partially regenerated $Al(OH)_3$ slurry was then pumped directly into the absorption tower, at the rate of 25 ml/minute. The whole process was operated for 8 hours. Altogether 627 millimoles of $SO_2$ gas was passed through the slurry—355 millimoles initially and 272 millimoles during the continuous operation stage. A total of 564 millimoles of $SO_2$ was absorbed by the $Al(OH)_3$ slurry—an absorption efficiency of 90%.

Sulfur balance at the end of the run showed that 204 millimoles of $SO_2$ was evolved while 269 millimoles remained in solution and 65 millimoles of sulfate was formed.

EXAMPLE 5

A comparative study of $SO_2$ absorption capacity of sodium hydroxide and gelatinous aluminum hydroxide (Fischer Scientific Co., Cat. No. A-581) was carried out in a stainless steel tubing of 1 inch diameter. The $SO_2$ absorption tower was 6 ft. long with two stainless steel strips twisted to 180° as packing material. One of the strips was 2 ft. and the other 3 ft. long. Both of them were 0.9 inches wide.

The SO₂ gas (from a cylinder) was diluted with hot and humidified air and then contacted with the scrubbing alkali in the tower in countercurrent flow. The temperature of the alkali in the tower was kept at about 130° F. The inlet and outlet $SO_2$ concentrations were monitored by a DuPont analyzer. The results are shown in the accompanying table. It may be noted that in spite of the lower L/G, lower alkali concentration and higher $SO_2$ inlet concentration $Al(OH)_3$ compares favorably with NaOH as an $SO_2$ removal agent.

TABLE

| Alkali | Conc. of Alkali g moles/l | L/G | Gas Velocity Ft/Sec. | $SO_2$ Conc. (PPM) Inlet | $SO_2$ Conc. (PPM) Outlet | $SO_2$ Removal Efficiency |
|---|---|---|---|---|---|---|
| NaOH | 0.4M | 34 | 5.01 | 2120 | 290 | 86.3 |
| $Al(OH)_3$ | 0.29M | 28 | 5.01 | 2840 | 800 | 71.8 |

EXAMPLE 6

Elemental sulfur was obtained by passing hydrogen sulfide gas through a spent $Al(OH)_3$ slurry containing $SO_2$. The reaction was carried out in the following manner:

The $Al(OH)_3$ used was made as described in the previous example. The $Al(OH)_3$ slurry used contained 137 millimoles of $Al^{+3}$ and 22 millimoles of sulfate ion. Through the above $Al(OH)_3$ slurry in 300 ml of water and at an initial pH of 5.80 an $SO_2$/Air mixture was passed in the manner described in Example 2. The passage of $SO_2$/air mixture was stopped when the pH of the slurry reached a value of 3.50. At this point 62 millimoles of $SO_2$ had passed through the slurry and all was absorbed by $Al(OH)_3$. Analysis of the slurry showed the following composition: Aluminum, 137 millimoles; sulfate, 23 millimoles; and sulfite-bisulfite mixture 61 millimoles. Through this slurry 75 millimoles of $H_2S$ was passed whereupon yellow elemental sulfur was formed. The pH of the slurry rose to 4.40. The sulfur was filtered off and the filtrate was analyzed. The results showed that 100 millimoles of elemental sulfur, free from aluminum, were formed and the solution contained 137 millimilles of aluminum, 24 millimoles of sulfate and a mixture containing 25 millimoles of sulfite and bisulfite. Thus, 60% of the absorbed $SO_2$, in this pH range, was reduced to elemental sulfur. Greater conversion of $SO_2$ to elemental sulfur can be achieved at higher final pH's than 4.40. However, because of side-reactions, e.g., thiosulfate formation, the actual yield of sulfur is considerably reduced at pH values higher than about 4.40.

What is claimed is:

1. A continuous absorption-regenerative process for removing $SO_2$ from a gas comprising contacting said gas in a first zone with an aqueous suspension of an absorbent consisting essentially of gelatinous aluminum hydroxide whereby the $SO_2$ is absorbed by said gelatinous aluminum hydroxide, withdrawing a portion of said aqueous suspension of gelatinous aluminum hydroxide containing absorbed $SO_2$ heating said portion of aqueous suspension in a second zone while sparging with a gas to evolve $SO_2$ therefrom and to convert said absorbent to suspended gelatinous aluminum hydroxide and recycling said regenerated aqueous suspension of gelatinous aluminum hydroxide to said first zone.

2. The process of claim 1 wherein said first zone consists essentially of an elongated, vertical column packed with an inert material pervious to the flow of said aqueous suspension and gas.

3. The process of claim 2 wherein said aqueous suspension and gas are contacted countercurrently in said vertical column.

4. The process of claim 1 comprising filtering at least a portion of the regenerated aqueous suspension to recover gelatinous aluminum hydroxide and a filtrate containing dissolved $Al_2(SO_4)_3$, recycling said filtered gelatinous aluminum hydroxide to said first zone, coverting said filtrate of dissolved aluminum sulfate to an aqueous suspension of gelatinous aluminum hydroxide and recycling said converted suspension to said first zone.

5. The process of claim 1 wherein said aqueous suspension and gas are contacted co-currently.

6. The process of claim 1, wherein the temperature of said aqueous suspension when contacted with said gas is in the range of ambient to about 180° F.

7. The process of claim 1 wherein the temperature of said aqueous suspension when contacted with said gas is from about 110° to about 140° F.

8. The process of claim 1 wherein the pH of said aqueous suspension prior to contact with said gas is in the range of from about 3 to about 8.

9. The process of claim 1 wherein said pH is in the range of from about 5 to about 6.

10. The process of claim 1 wherein said pH is maintained at the value above about 2.8.

11. The process of claim 1 wherein said gas is a flue gas.

12. The process of claim 1 wherein said aqueous suspension contains from about 1% to about 15%, by weight, of gelatinous aluminum hydroxide.

13. The process of claim 1 wherein said gelatinous aluminum hydroxide is freshly prepared prior to contact with said gas by precipitation with a base from an aqueous solution of a soluble aluminum salt.

14. The process of claim 13 wherein said salt is aluminum sulfate or aluminum chloride.

15. The process of claim 1 wherein said gelatinous aluminum hydroxide is prepared by precipitation with an acid from an aqueous solution of a soluble aluminate.

16. The process of claim 1 wherein said aqueous suspension is heated to above about 158° to evolve $SO_2$.

17. A continuous absorption-regenerative process for removing $SO_2$ from a gas comprising contacting said gas in a first zone with an aqueous suspension of an absorbent consisting essentially of gelatinous aluminum hydroxide whereby the $SO_2$ is absorbed by said gelatinous aluminum hydroxide, withdrawing a portion of said aqueous suspension of gelatinous aluminum hydroxide containing absorbed $SO_2$, reacting the said portion of said suspension with $H_2S$ in a second zone to convert said absorbent to suspended gelatinous aluminum hydroxide and sulfur and recycling said regenerated aqueous suspension of gelatinous aluminum hydroxide to said first zone.

* * * * *